US012735311B2

(12) United States Patent
Tesi et al.

(10) Patent No.: US 12,735,311 B2
(45) Date of Patent: Sep. 15, 2026

(54) DRINKING WATER DISPENSER

(71) Applicant: ONN WATER S.R.L., Vado Ligure (IT)

(72) Inventors: Paolo Tesi, Vado Ligure (IT); Simone Maiestrello, Vado Ligure (IT)

(73) Assignee: ONN WATER S.R.L. (IT)

( * ) Notice: Subject to any disclaimer, the term of this patent is extended or adjusted under 35 U.S.C. 154(b) by 148 days.

(21) Appl. No.: 18/864,487

(22) PCT Filed: May 9, 2023

(86) PCT No.: PCT/IB2023/054779
§ 371 (c)(1),
(2) Date: Nov. 25, 2024

(87) PCT Pub. No.: WO2023/218337
PCT Pub. Date: Nov. 16, 2023

(65) Prior Publication Data

US 2025/0304422 A1 Oct. 2, 2025

(30) Foreign Application Priority Data

May 9, 2022 (IT) ........................ 102022000009521

(51) Int. Cl.
*B67D 1/08* (2006.01)
*B67D 1/12* (2006.01)

(52) U.S. Cl.
CPC ......... *B67D 1/0857* (2013.01); *B67D 1/1279* (2013.01); *B67D 2210/0001* (2013.01)

(58) Field of Classification Search
CPC ................ B67D 1/0857; B67D 1/1279; B67D 2210/0001; B67D 2210/0006; B67D 1/0858; B67D 1/0014
See application file for complete search history.

(56) References Cited

U.S. PATENT DOCUMENTS 4,830,511 A * 5/1989 Smazik ................ B67D 1/1277 366/273
5,257,466 A * 11/1993 Kishi ...................... F23G 7/001 34/95

(Continued)

FOREIGN PATENT DOCUMENTS

DE 202013005166 U1 * 7/2013 ........... B67D 1/0003
EP 1496011 A1 * 1/2005 ............... B67D 1/12

(Continued)

OTHER PUBLICATIONS

International Search Report and Written Opinion in related PCT Application No. PCT/IB2023/054779 mailed Nov. 1, 2022, 7 pages.

*Primary Examiner* — Bob Zadeh

(57) ABSTRACT

Drinking water distributor device provided with a hydraulic circuit comprising a water inlet solenoid valve in said circuit, a pump connected downstream of said inlet solenoid valve, a first dispensing solenoid valve connected downstream of said pump and a second dispensing solenoid valve, a refrigeration unit, a collector and a dispensing nozzle connected downstream of said collector, said first and second dispensing solenoid valves each having a first outlet in connection with said nozzle through said collector, said first dispensing solenoid valve being provided with a second outlet in connection with the inlet of said second dispensing solenoid valve through the refrigeration unit, such that said first and second dispensing solenoid valves are configured to provide the dispensing of water at room temperature and of chilled water respectively. The second dispensing solenoid valve is provided with a second outlet, a first recirculation solenoid valve.

9 Claims, 8 Drawing Sheets

(56) References Cited

U.S. PATENT DOCUMENTS

| | | | | | |
|---|---|---|---|---|---|
| 5,765,726 | A * | 6/1998 | Jones | B67D 1/1277 222/64 |
| 6,981,387 | B1 * | 1/2006 | Morgan | B67D 1/0016 62/390 |
| 2013/0062366 | A1 * | 3/2013 | Tansey | B67D 1/0809 222/101 |
| 2015/0329343 | A1 * | 11/2015 | Kleinrchert | B67D 1/0406 222/146.6 |
| 2025/0304422 | A1 * | 10/2025 | Tesi | B67D 1/0014 |

FOREIGN PATENT DOCUMENTS

| | | | | |
|---|---|---|---|---|
| EP | 2546186 | A1 * | 1/2013 | B67D 1/0016 |
| EP | 4112535 | A1 * | 1/2023 | B67D 3/0022 |
| ES | 2653638 | T3 * | 2/2018 | B67D 3/0012 |
| WO | 2012178044 | A1 | 12/2012 | |

* cited by examiner

DRINKING WATER DISPENSER

SUMMARY

The present invention relates to a drinking water distributor device provided with a hydraulic circuit comprising:

a) a water inlet solenoid valve in the circuit, b) a pump connected downstream of said inlet solenoid valve, c) a first dispensing solenoid valve connected downstream of said pump and a second dispensing solenoid valve, d) a refrigeration unit, e) a collector;

f) and a dispensing nozzle connected downstream of said collector.

The said first and second dispensing solenoid valves each have a first outlet in connection with the said nozzle through the said collector.

The said first dispensing solenoid valve is provided with a second outlet in connection with the inlet of said second dispensing solenoid valve through the refrigeration unit.

In this way the said first and second dispensing solenoid valves are configured to provide the dispensing of water at room temperature and of chilled water respectively.

The distributors are drinking water dispensing devices, which have the peculiarity of being subject, from a hygienic point of view, to phenomena of bacterial proliferation, especially within the hydraulic circuit in conditions of poor use of the distributor itself.

One of the causes of possible contamination can relate to the presence of bacteria in the water of the aqueduct that supplies the distributor. Regarding the aqueduct itself, in general a bacterial presence is almost irrelevant or undetectable but, once it has access to the distributor, an environment is found here that is fertile for proliferation, due to the residual moisture that remains in the hydraulic circuit.

The main causes of the presence of bacteria in water distributors can be classified as follows:

presence of bacteria in the water supply network of the water distributor;

low use of the distributor or long intervals of non-use resulting in water staticity and bio-film formation;

high temperature of the location where the distributor is installed;

high temperature of the water inlet into the hydraulic circuit of the distributor;

limited maintenance of the device.

Several solutions to minimize the likelihood of having bacterial proliferation in these devices are available to date.

The most relevant of these relate to the use of solutions containing oxidizing substances—such as chlorine—in the water network, which annihilate the microorganisms themselves or reduce their growth.

However, this solution solves the problem in the short and medium term: if the distributor thus sanitized is rarely used, for example, the possibility of having bacterial proliferation following sanitization increases considerably.

In addition, agents such as chlorine must be removed from the water before it is dispensed by the distributor, in order to preserve the health of people who intend to consume the water dispensed.

To do this, activated carbon filters are typically installed, either outside the distributor or inside the hydraulic circuit of the distributor, with the purpose of refining the water.

The activated carbon filters therefore ensure that the water exiting the dispensing nozzle of the distributor is as tasteless as possible, free of odours and of course free of potentially harmful substances such as chlorine.

Inside the water distributor, the bacteria tend to proliferate due to the fact that there is no longer the presence of chlorine that has been appropriately removed from the water by the activated carbon filter.

The probability of having bacteria present in the water network, although sometimes in undetectable quantities, is normally not a problem for human health as long as there is the presence of oxidizing substances such as chlorine in the water that normally reduces bacterial growth up to a total biocidal effect.

The presence of activated carbon filters in the water distributors, suitably installed on the water supply line in order to refine the water, on the one hand constitutes an advantage, making the water tasteless and free of odours and substances such as chlorine, on the other makes the water extremely susceptible to the possible formation of bacterial load, as it lacks the presence of a biocidal active component. The direct consequence is the formation of biofilm, especially if the appliance is rarely used, making the water distributors (with irregular or incorrect use, unuse, lack of cleaning and periodic maintenance) potentially dangerous appliances. Between 25 and 45° C., in static conditions, bacterial growth and consequently the biofilm are particularly encouraged in the areas of the water system that are not refrigerated.

The filter, however, ends up being one of the main causes of incubation of microorganisms and bacteria. Due to its porous structure, in fact, the filter can block elements such as calcium that provide nutrition for the bacteria themselves, as well as blocking those agents that are unwanted. The activated carbon filter, as mentioned, can be installed outside the distributor—and receive first the water coming from the water supply line and then send it, once filtered, to the distributor itself—or directly to the inside of the hydraulic circuit of the distributor.

In both cases the filter is therefore stationed in areas typically at room temperature, a factor that, in combination with low use of the distributor and/or with a not always timely replacement of the filter, may involve the formation on the filter itself of a layer of bio-film, which inevitably contributes to promoting bacterial proliferation in the water distributor.

WO 2012/178044 A1 describes an apparatus for dispensing water comprising: a main inlet configured to receive water from a source; a chilled water line, comprising: an in-line gasifier; a water inlet valve of a carbonator configured to selectively direct water from the main inlet to the carbonator; an inlet valve for the gas of the carbonator configured to selectively direct carbonation gas to the carbonator; and an outlet for the chilled water line. The apparatus may be integrated into a refrigerator or other main apparatus.

To date, an effective solution to minimize, continuously over time, bacterial proliferation in water distributors is lacking.

In particular, there is a need for a system that can provide a regular recirculation of low temperature water in the hydraulic circuit of a distributor, since it is known that standing water and high temperatures are two of the main causes of bacterial proliferation.

In particular, there is a need for a system that can provide a regular recirculation of low temperature water in the hydraulic circuit of a distributor, even in normally non refrigerated areas and in the activated carbon filter.

The present invention aims to overcome the drawbacks of the aforementioned prior art through a system as disclosed at the beginning, wherein said second dispensing solenoid valve is provided with a second outlet, a first recirculation solenoid valve being provided configured to receive the chilled water dispensed from the second outlet of said second dispensing solenoid valve, said first recirculation solenoid valve being connected to the circuit between the inlet solenoid valve and the first dispensing solenoid valve through its own first outlet and being configured to provide through said own first outlet the re-introduction of the chilled water into said hydraulic circuit.

The device according to the present invention is configured to provide:

a) the dispensing of at least room temperature still water and chilled still water; and b) a recirculation of chilled water in the delivery pipes and through the components of the hydraulic circuit.

The terms “recirculation” or “re-introduction” are used interchangeably in the present disclosure, and both refer to a movement of chilled water within the hydraulic circuit of a distributor. The term “chilled water” in the present patent application preferably refers to chilled still water, as well as to carbonated chilled water, as will be illustrated in detail below.

The term “hydraulic circuit” is intended to refer to a set of components, connected to each other through delivery pipes, configured to receive water from an external water supply line and to provide refrigeration and movement up to the dispensing nozzle in a distributor.

Preferably, the term “hydraulic circuit” refers to an apparatus as better described below, especially in relation to the passage of water through the components reported above, said components being connected to each other by delivery pipes, as better illustrated in the figures.

The inlet solenoid valve constitutes an inlet for the water—coming from an external water supply line—in the delivery pipes of the hydraulic circuit that supplies the distributor. From said inlet solenoid valve, the water reaches the pump, which pushes it along a delivery pipe that leads it to the first dispensing solenoid valve.

The inlet solenoid valve is preferably provided with a non-return valve.

This first dispensing solenoid valve, which is configured to dispense still water at room temperature, comprises two outlets, preferably alternately operable.

If the dispensing solenoid valve provides for the opening of the first outlet, then the water is conveyed to the said collector, which leads it to the dispensing nozzle of the distributor, from which room-temperature water is then dispensed.

Alternatively, if the dispensing solenoid valve provides for the opening of the second outlet—and the concomitant closing of the first outlet, said outlets preferably being operable alternately—the water at room temperature is channelled into the refrigeration unit, which results in being located downstream of the second outlet of the first dispensing solenoid valve.

The refrigeration unit preferably comprises a heat exchanger, for example coil shaped, and is configured to provide for the cooling of the water coming from the first dispensing solenoid valve.

In particular, the heat exchanger is maintained at a controlled temperature of 4° C.

The chilled water exiting the refrigeration unit reaches the second dispensing solenoid valve, also equipped with two outlets, configured to be operated alternately.

If the dispensing solenoid valve provides for the opening of the first outlet, then the chilled water is conveyed into said collector, which leads it to the dispenser nozzle of the distributor, from which it is dispensed.

In one embodiment, the hydraulic circuit as described comprises, downstream of the pump, one or more sanitization means, such as for example activated carbon filters, germicidal lamps or similar.

The hydraulic circuit as described comprises, in addition, one or more elements/means configured to be able to provide the recirculation of chilled water in the hydraulic circuit itself, said elements/means being in hydraulic communication with each other and with the hydraulic circuit through special delivery pipes.

In particular, the system that is the object of the present invention comprises, in addition to the hydraulic circuit described, a first recirculation solenoid valve, which first recirculation solenoid valve is configured to receive the chilled water dispensed from the second outlet of the second dispensing solenoid valve. Said first recirculation solenoid valve, which is therefore disposed downstream of the second outlet of the second dispensing solenoid valve, is configured to provide, through its own outlet, the re-introduction of chilled water into said hydraulic circuit, as best illustrated in the figures.

Consequently, if the second dispensing solenoid valve of the circuit provides for the opening of the second outlet—and the concomitant closing of the first outlet, said outlets being alternately operable—the chilled water is sent to said first recirculation solenoid valve which, through its own first outlet, provides for re-introduction of the chilled water into the hydraulic circuit, as will be described in detail below.

Advantageously, said first recirculation solenoid valve consequently provides a recirculation of the chilled water inside the hydraulic circuit of the distributor.

Said water, being chilled to a temperature comparable to that at which the heat exchanger is maintained, i.e. to a controlled temperature of 4° C., is advantageously in bacteriostatic condition.

In addition, the system, by providing the recirculation of chilled water in the hydraulic circuit, reduces the static nature of the water in the circuit even under conditions of low use of the distributor or long intervals of non-use.

The re-introduction action of the chilled water is in fact provided by the first recirculation solenoid valve, preferably when, as disclosed above, the outlets of the two dispensing solenoid valves connected to the collector are closed.

As previously mentioned, the hydraulic circuit may comprise, downstream of the pump, one or more sanitization means, such as for example activated carbon filters, germicidal lamps or similar. A germicidal lamp system may for example comprise one or more UV-C led modules, with local biocidal action.

Advantageously, the system described provides for the recirculation of chilled water also in said means.

In the case of the filter, this decreases the temperature of the filter itself—which is normally equal to that of the surrounding environment—helping to inhibit on site a possible proliferation of microorganisms, which, as is known, find favourable conditions for development here.

According to one embodiment, the system comprises a check valve downstream of the outlet of the first recirculation solenoid valve configured to re-introduce chilled water into the circuit.

Advantageously, the presence of the check valve ensures that the water can travel along the delivery pipe that re-introduces it into the hydraulic circuit only in the desired direction.

According to one embodiment, said first recirculation solenoid valve comprises a second outlet.

According to one embodiment, the system comprises a carbonator and a third dispensing solenoid valve having at least one outlet, the carbonator being configured to receive chilled water from said second outlet of the first recirculation solenoid valve and to send carbonated chilled water to the third dispensing solenoid valve, said third dispensing solenoid valve having the first outlet connected to the nozzle through the collector and being configured to provide the dispensing of carbonated chilled water.

Consequently, if the first recirculation solenoid valve instead provides for the opening of the second outlet—and therefore the concomitant closing of the first, the two outlets being preferably operable alternately—the chilled water is no longer re-introduced into the hydraulic circuit, but is sent to the carbonator.

Carbonated chilled water comes out of the carbonator, which is sent to the third dispensing solenoid valve.

In particular, the carbonator is a component which, like the heat exchanger of the hydraulic circuit, is preferably maintained at a controlled temperature of 4° C. inside the distributor.

If the third dispensing solenoid valve provides for the opening of the first outlet, like the first and second dispensing solenoid valves already disclosed, then the carbonated chilled water is conveyed into said collector, which leads it to the dispensing nozzle, from which it is dispensed.

The system thus described is therefore advantageously configured to be able to provide:

a) a choice of the dispensing of still water at room temperature, the dispensing of chilled still water, the dispensing of carbonated chilled water, and
b) the recirculation of the chilled still water within the hydraulic circuit, preferably in a non-operational phase of dispensing distributor.

According to one embodiment, the system comprises a check valve downstream of the second outlet of the first recirculation solenoid valve.

In particular, said non-return valve is disposed at the delivery pipe that brings the chilled water out of the second outlet of said first recirculation solenoid valve to the carbonator.

Advantageously, the presence of the non-return valve ensures that the water can travel through the delivery pipe that leads it to the carbonator only in the desired direction.

According to one embodiment, the device that is the object of the present invention comprises a non-return valve in communication with the carbonator, said valve being configured to provide the introduction of carbon dioxide to gas the chilled water in said carbonator.

According to one embodiment, the system comprises a second recirculation solenoid valve at an outlet, said solenoid valve being configured to a) receive the carbonated chilled water dispensed from a second outlet of the third dispensing solenoid valve; and
b) provide, through its own outlet, the re-introduction of said carbonated chilled water into said hydraulic circuit.

Consequently, if the third dispensing solenoid valve does not provide for the opening of the first outlet—the opening of which, as mentioned, would involve conveying the carbonated chilled water into the collector, which would lead it to the dispensing nozzle—but the opening of a second outlet, then the carbonated chilled water is sent to the said second recirculation solenoid valve, which re-introduces the carbonated chilled water into the hydraulic circuit.

Advantageously, said second recirculation solenoid valve consequently provides a recirculation of the carbonated chilled water inside the hydraulic circuit of the distributor.

Said water, being chilled to a temperature comparable to that at which the carbonator is maintained, i.e. to a controlled temperature of 4° C., is advantageously in a bacteriostatic condition.

Moreover, the carbonated chilled water is even less affected by the risk of a possible increase in bacterial load thanks to the presence of carbonic acid, obtained by combining the water with the carbon dioxide inside the carbonator.

In addition, the system, by providing the recirculation of carbonated chilled water in the hydraulic circuit, reduces the static nature of the water in the circuit even in conditions of low use of the distributor or long intervals of non-use.

The action of re-introducing the carbonated chilled water—similarly to the case disclosed above for chilled water—is in fact provided by the second recirculation solenoid valve preferably when, as disclosed above, the outlet of the third dispensing solenoid valve connected to the collector is closed.

According to one embodiment, the system comprises a check valve downstream of the outlet of the second recirculation solenoid valve configured to re-introduce the carbonated chilled water into the hydraulic circuit.

Advantageously, the presence of such a non-return valve ensures that the carbonated chilled water can travel along the delivery pipe that re-introduces it into the hydraulic circuit only in the desired direction.

According to one embodiment, said first and second recirculation solenoid valves are configured to provide water recirculation in the hydraulic circuit alternately.

Accordingly, the system may separately provide for:

re-introduction, into the hydraulic circuit, of chilled water and re-introduction, into the hydraulic circuit, of carbonated chilled water.

According to a preferred embodiment, the device is provided with a control unit connected to the solenoid valves and configured to provide a first recirculation through the chilled still water, i.e. exploiting the first recirculation solenoid valve.

This first recirculation provides, in general, a lowering of the temperature of the hydraulic circuit, in particular of the characteristic components of the hydraulic circuit previously disclosed and of the delivery pipes that connect them to each other.

Subsequently, the control unit provides a second recirculation through the carbonated chilled water, i.e. through the second recirculation solenoid valve.

Carbonated chilled water is even less affected by the risk of a possible increase in bacterial load due to the presence of carbonic acid, helping to make the entire hydraulic circuit even safer with respect to possible unwanted agents.

Furthermore, if sanitization means are present in the circuit, such as, for example, the activated carbon filter—which can be placed downstream of the pump—these means would also be affected by the advantages of water recirculation.

The temperature of the filter—which is normally that of the surrounding environment—would in fact be lowered, increasing the possibility of inhibiting in situ a possible proliferation of microorganisms, which, as is known, find favourable conditions for development here.

Moreover, the presence of carbonic acid guarantees an additional germicidal effect on any microorganisms already in the proliferation phase on the filter itself.

According to one embodiment, said first and second recirculation solenoid valves are configured to re-introduce chilled water into the hydraulic circuit downstream of said inlet solenoid valve, preferably equipped with a check valve.

Preferably this configuration is valid when the hydraulic circuit includes, in an intermediate position between the pump and the first still water dispensing solenoid valve at room temperature, at least one sanitization means such as an activated carbon filter.

Consequently, said first and second recirculation solenoid valves provide for the re-introduction of chilled water and carbonated chilled water into the hydraulic circuit through a common delivery pipe, which flows into said hydraulic circuit downstream of the inlet solenoid valve, before the pump, as best illustrated in the figures.

According to one embodiment, as an alternative to the preceding one, the system may comprise a filter external to said hydraulic circuit and connected thereto, said filter being positioned upstream of and in communication with said inlet valve.

In this configuration, the filter is therefore no longer located inside the hydraulic circuit, but in a position external to the latter—and to the distributor—and acts as a connection, from a hydraulic point of view, between the distributor and the external water network that supplies the water distributor.

According to one embodiment, said first and second recirculation solenoid valves are configured to re-introduce chilled water into the hydraulic circuit by prior flow of said chilled water into said external filter.

Consequently, said first and second recirculation solenoid valves provide for the re-introduction of chilled water and carbonated chilled water into the hydraulic circuit through a common delivery pipe, which flows into the external filter, as best illustrated in the figures. From the external filter, then, the water can subsequently be recirculated in the hydraulic circuit through the inlet solenoid valve, the filter and the inlet solenoid valve being in communication with each other from the hydraulic point of view.

Advantageously, the filter, even if in a position outside the distributor, still benefits from the advantages of water recirculation.

The temperature of the filter—which is normally that of the surrounding environment—is in fact lowered, increasing the possibility of inhibiting in situ a possible proliferation of microorganisms, which, as is known, find favourable conditions for development here.

Moreover, the presence of carbonic acid guarantees an additional germicidal effect on any microorganisms already in the proliferation phase on the filter itself.

The water, according to this embodiment, then enters the hydraulic circuit at least in an already chilled condition.

In one embodiment, an Ag/Cu ion enrichment module is provided in connection with said hydraulic circuit.

This allows active elements such as $Ag+$ and $Cu+$ ions with antibacterial action to be released into the circuit in quantities well below legal standards.

During the recirculation, the ion enrichment module releases $Ag+$ and $Cu+$ ions that become an active element in circulation throughout the hydraulic circuit and especially in the filter, with long-term antibacterial capacity. Silver ions are particularly active and rapidly penetrate the membranes of bacteria; they interact with enzymes and other proteins present in bacteria causing them to lose their virality and bind to microbial DNA and RNA preventing cell replication. Copper ions are toxic to pathogenic organisms, affecting in particular the protein structure of the spores of the latter, preventing their respiration and therefore the possibility of germinating.

The said control unit controls the functions set out above according to specific algorithms thanks also to the presence along the hydraulic circuit of appropriate sensors, in particular conductivity measurement and, optionally, pH measurement sensors. Both these types of sensors can be used to check the status of the circuit following a scheduled sanitization or a recirculation with carbonated water and, over longer periods of time, for a possible analysis of ongoing fermentation in the case of stagnant water and prolonged inactivity.

It is also possible to provide special optical absorption/refraction transducers for the counting specific particles of a pollutant or a pathogen in suspension, thanks to the modularity of the circuit.

The set of all the modules disclosed allows, in addition to the normal process of periodic sanitization, the disinfection (not sterilization) of the dispenser to be maintained for longer periods of time, thus lengthening the mandatory time windows of scheduled maintenance/sanitization, reducing the costs of using the water distributor without impacts on the quality of the product.

BRIEF DESCRIPTION OF THE FIGURES

These and other features and advantages of the present invention will become clearer from the following disclosure of some embodiment examples illustrated in the accompanying drawings in which.

DETAILED DESCRIPTION

Figure 1:
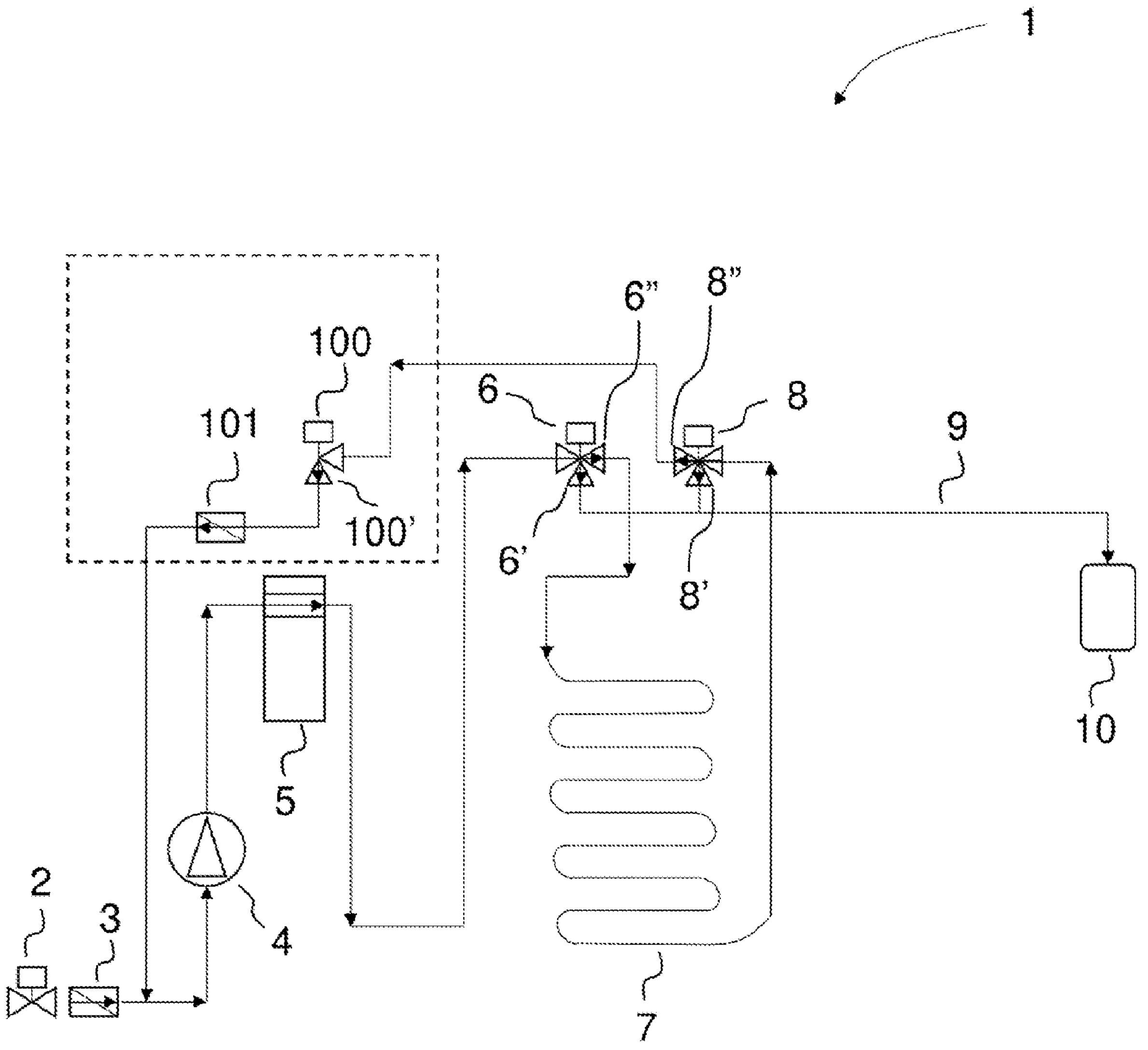
FIG. 1 illustrates a schematic representation of a first embodiment of the system configured to provide for the re-introduction of chilled still water into the hydraulic circuit with internal filter of a distributor capable of dispensing room temperature still water and chilled still water.

In detail, FIG. 1 illustrates a first embodiment of the system for the recirculation of water 1 in the hydraulic circuit with an internal filter of a distributor configured to dispense still water at room temperature and chilled still water. The system 1 comprises a hydraulic circuit comprising an inlet solenoid valve 2 for the water coming from an external water supply line, said inlet solenoid valve 2 being provided with a non-return valve 3, a pump 4 configured to push the water along a delivery pipe that leads it through an activated carbon filter 5 and, subsequently, to a first dispensing valve 6. The first dispensing solenoid valve 6 comprises two outlets 6' and 6", configured to be operated alternately. Through the first outlet 6', the still water at room temperature is conveyed to a collector 9 and sent to a nozzle 10, which provides for dispensing water from the distributor.

When said first outlet 6' is open, the water coming into said first dispensing solenoid valve 6 can only be directed towards the nozzle 10. When the second outlet 6" instead turns out to be open, the water coming to the first solenoid valve 6 is sent to a refrigeration unit 7 provided with a coil-shaped heat exchanger and preferably chilled to 4° C.

Here the water is chilled, and then arrives at a second dispensing solenoid valve 8, also comprising two outlets 8' and 8" configured to be actuated in an alternating manner.

When the first outlet 8' is open, the chilled still water leaving the heat exchanger 7 can therefore only flow to the collector 9 and from here reach the dispensing nozzle 10.

In the system 1, when the second outlet 8" is open, the chilled still water leaving the heat exchanger 7 passes into the said second dispensing solenoid valve 8 to reach a subsequent first recirculation solenoid valve 100, configured to re-introduce the chilled still water into the hydraulic circuit.

The first recirculation solenoid valve 100, in fact, once it receives the chilled still water from the second dispensing solenoid valve 8, can recirculate it in the hydraulic circuit through a delivery pipe which, starting from the outlet 100' and including a non-return valve 101, flows into the hydraulic circuit downstream of the inlet solenoid valve 2.

Figure 2:
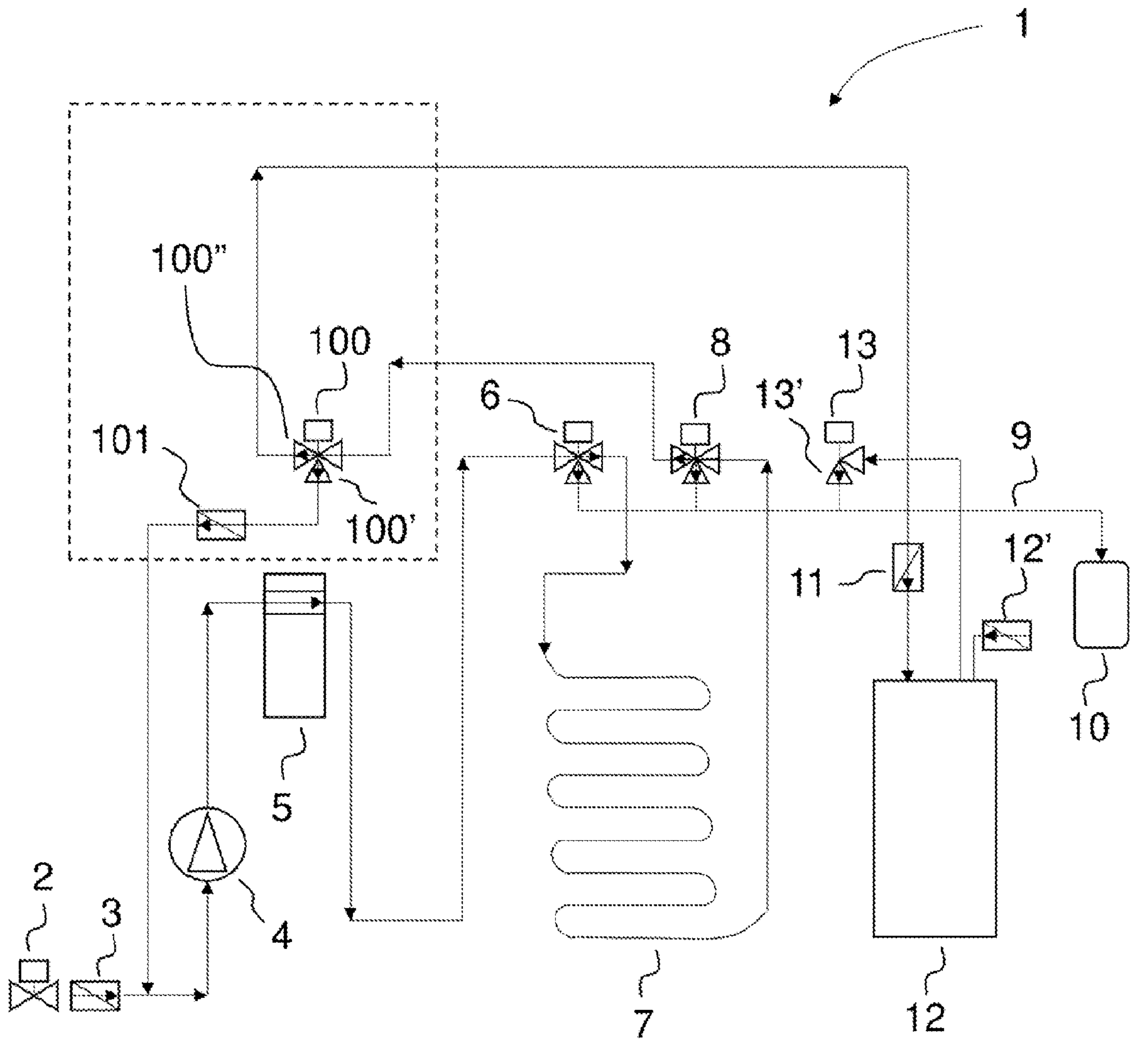
FIG. 2 illustrates a schematic representation of a second embodiment of the system configured to provide for the re-introduction of chilled still water into the hydraulic circuit with internal filter of a distributor capable of dispensing still water at room temperature, chilled still water and carbonated chilled water.

FIG. 2 illustrates a second embodiment of the device for water recirculation 1 in the hydraulic circuit with internal filter 5 of a distributor configured to dispense still water at room temperature, chilled still water and carbonated chilled water. The system comprises, in addition to what is described in relation to FIG. 1, a second outlet 100" for the first recirculation solenoid valve 100, a carbonator 12 and a third dispensing solenoid valve 13 having an outlet 13'. Consequently, the first recirculation solenoid valve 100, as an alternative to the possibility of providing the re-introduction of chilled still water into the hydraulic circuit via its outlet 100', can convey the chilled still water towards the carbonator 12, in particular by passing it through a non-return valve 11 located downstream of the second outlet 100" of the first recirculation solenoid valve 100. The chilled still water, once in the carbonator 12, is mixed with carbon dioxide which is blown into the carbonator 12 itself through a non-return valve 12', creating carbonated chilled water.

The carbonated chilled water is then sent to the third dispensing solenoid valve 13 which, through its outlet 13', conveys the carbonated chilled water into the collector 9, which from here reaches the dispensing nozzle 10.

Figure 3:
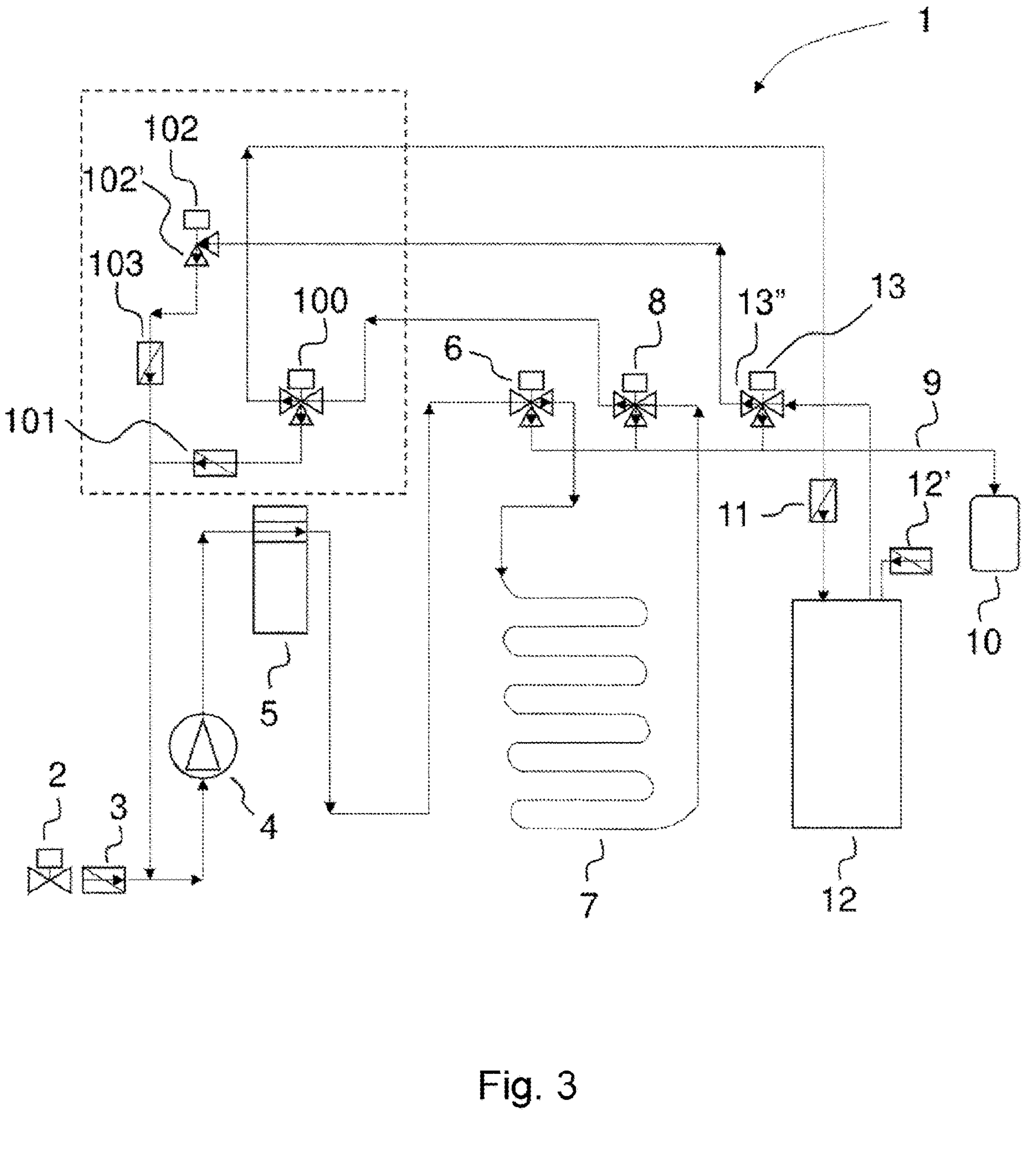
FIG. 3 illustrates a schematic representation of a third embodiment of the system configured to provide for the re-introduction of chilled still water and carbonated chilled water into the hydraulic circuit with internal filter of a distributor capable of dispensing room temperature still water, chilled still water and carbonated chilled water.

FIG. 3 illustrates a third embodiment of the system for recirculating water 1 in the hydraulic circuit with internal filter 5 of a distributor configured to dispense still water at room temperature, chilled still water and carbonated chilled water. In particular, the device 1, in addition to what has been disclosed so far, comprises a second outlet 13" of the third dispensing solenoid valve 13 and a second recirculation solenoid valve 102 configured to provide for the re-introduction of the carbonated chilled water into the hydraulic circuit.

Consequently, the third dispensing solenoid valve 13, as an alternative to the possibility of flowing the carbonated chilled water into the collector 9 through its first outlet 13', can send, through the second outlet 13", the carbonated chilled water to the second recirculation solenoid valve 102, which provides through its outlet 102' to re-introduce it into the hydraulic circuit downstream of the inlet solenoid valve 2. In particular, the carbonated chilled water, once it has exited the second recirculation solenoid valve 102, crosses a non-return valve 103 on its way to be re-introduced into the hydraulic circuit.

The first recirculation solenoid valve 100 and the second recirculation solenoid valve 102 are preferably operable in sequence for the purpose of recirculation, that is, the device firstly provides for the recirculation of chilled still water through the first recirculation solenoid valve 100 to cool the temperature of the hydraulic circuit and, secondly, for the recirculation of carbonated chilled water through the second recirculation solenoid valve 102, so as to provide an additional sanitizing action in the hydraulic circuit through the carbonic acid that is generated in the carbonator as a result of the combination of water and carbon dioxide. The solenoid valves 6, 8, 13, 100 and 102 are controlled by a control unit, not illustrated in the figures.

Figure 4:
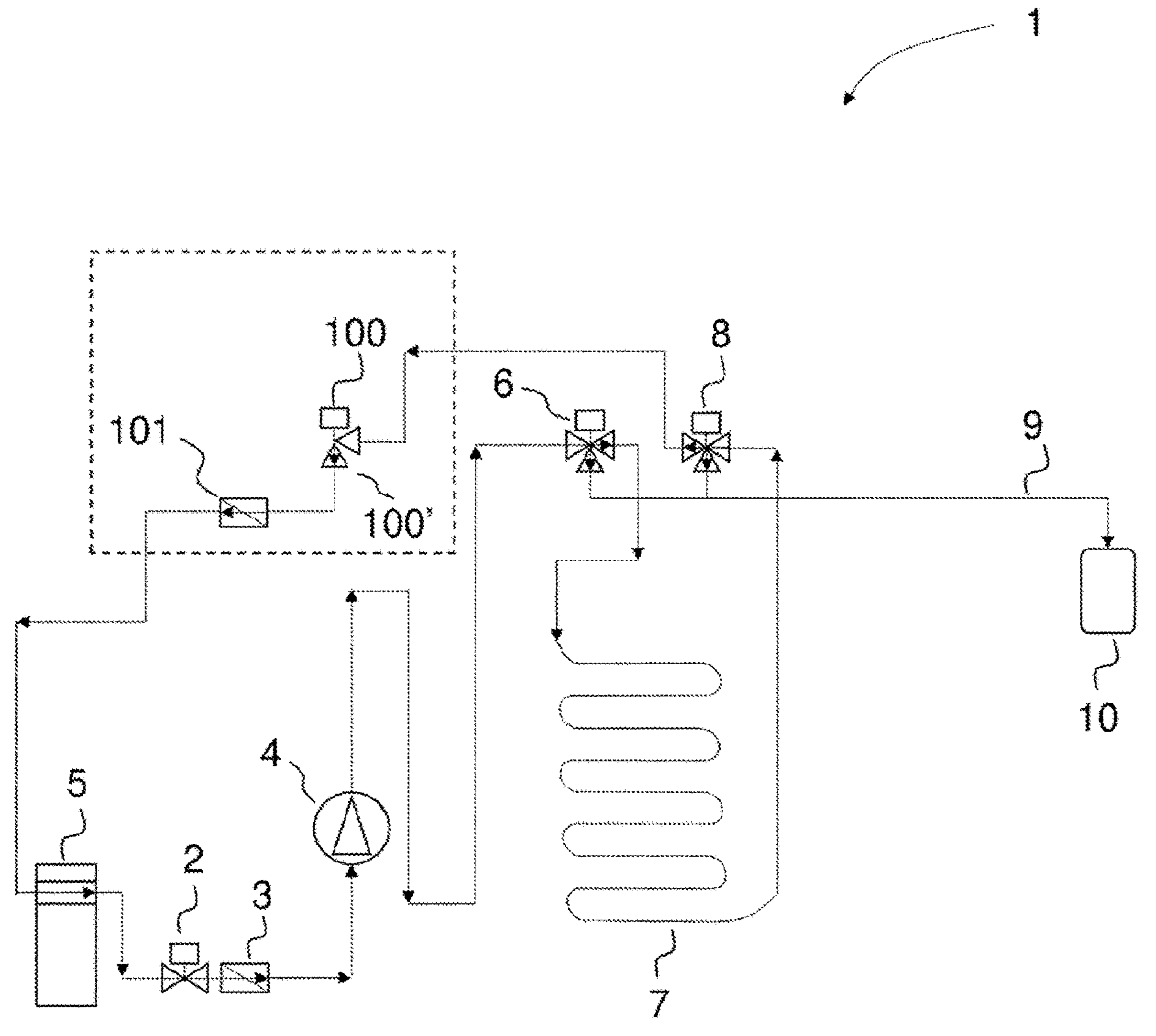
FIG. 4 illustrates a schematic representation of a fourth embodiment of the system configured to provide for the re-introduction of chilled still water into the hydraulic circuit with external filter of a distributor capable of dispensing room temperature still water and chilled still water.

FIG. 4 illustrates a fourth embodiment of the water recirculation system 1 in the hydraulic circuit with external filter of a distributor. In particular, the embodiment illustrated here refers to the same as in FIG. 1 but, this time, the activated carbon filter 5 is placed externally to the hydraulic circuit, and therefore externally to the same dispensing distributor.

The first recirculation solenoid valve 100 no longer provides, directly, the re-introduction of the chilled still water into the hydraulic circuit downstream of the inlet solenoid valve 2, but sends the water to the filter 5, which is in a position external to the hydraulic circuit, in particular located upstream of said inlet solenoid valve 2 and in communication with it. The filter 5 consequently receives the chilled still water from the first recirculation solenoid valve 100 and re-introduces it into the hydraulic circuit through said inlet solenoid valve 2.

Figure 5:
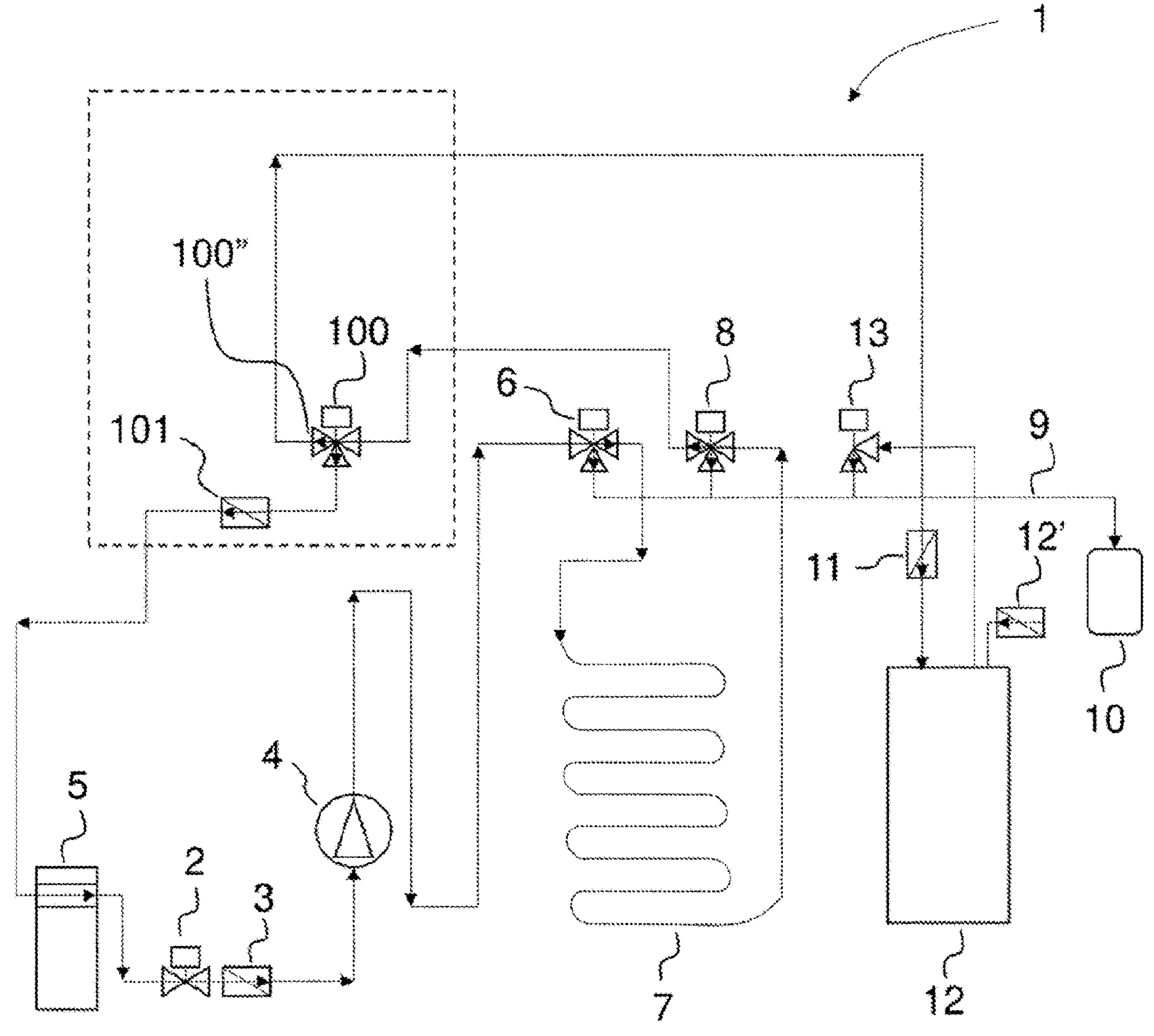
FIG. 5 illustrates a schematic representation of a fifth embodiment of the system configured to provide for the re-introduction of chilled still water into the hydraulic circuit with external filter of a distributor capable of dispensing still water at room temperature, chilled still water and carbonated chilled water.

FIG. 5 illustrates a fifth embodiment of the water recirculation system 1 in the hydraulic circuit with external filter of a distributor. In particular, the embodiment illustrated here refers to the same as in FIG. 2 but, this time, the activated carbon filter 5 is placed externally to the hydraulic circuit, and therefore externally to the same dispensing distributor.

The solenoid valve 100, similar to that described in FIG. 4, provides, through its outlet 100', to send the chilled water to the external filter 5, located upstream of said inlet solenoid valve 2 and in communication with it. The filter 5 then re-introduces the chilled water into the hydraulic circuit of the distributor. Alternatively, similar to what is described in FIG. 2, when the outlet 100' of the first recirculation solenoid valve 100 is closed, the first recirculation solenoid valve 100 can, through its second outlet 100", convey the chilled still water towards the carbonator 12, in particular by passing it through a non-return valve 11 located downstream of the second outlet 100" of the first recirculation solenoid valve. The chilled still water, once in the carbonator 12, is mixed with carbon dioxide which is blown into the carbonator 12 itself through a non-return valve 12', creating carbonated chilled water.

The carbonated chilled water is then sent to the third dispensing solenoid valve 13 which, through its outlet 13', conveys the carbonated chilled water into the collector 9, and from here reaches the dispensing nozzle 10.

Figure 6:
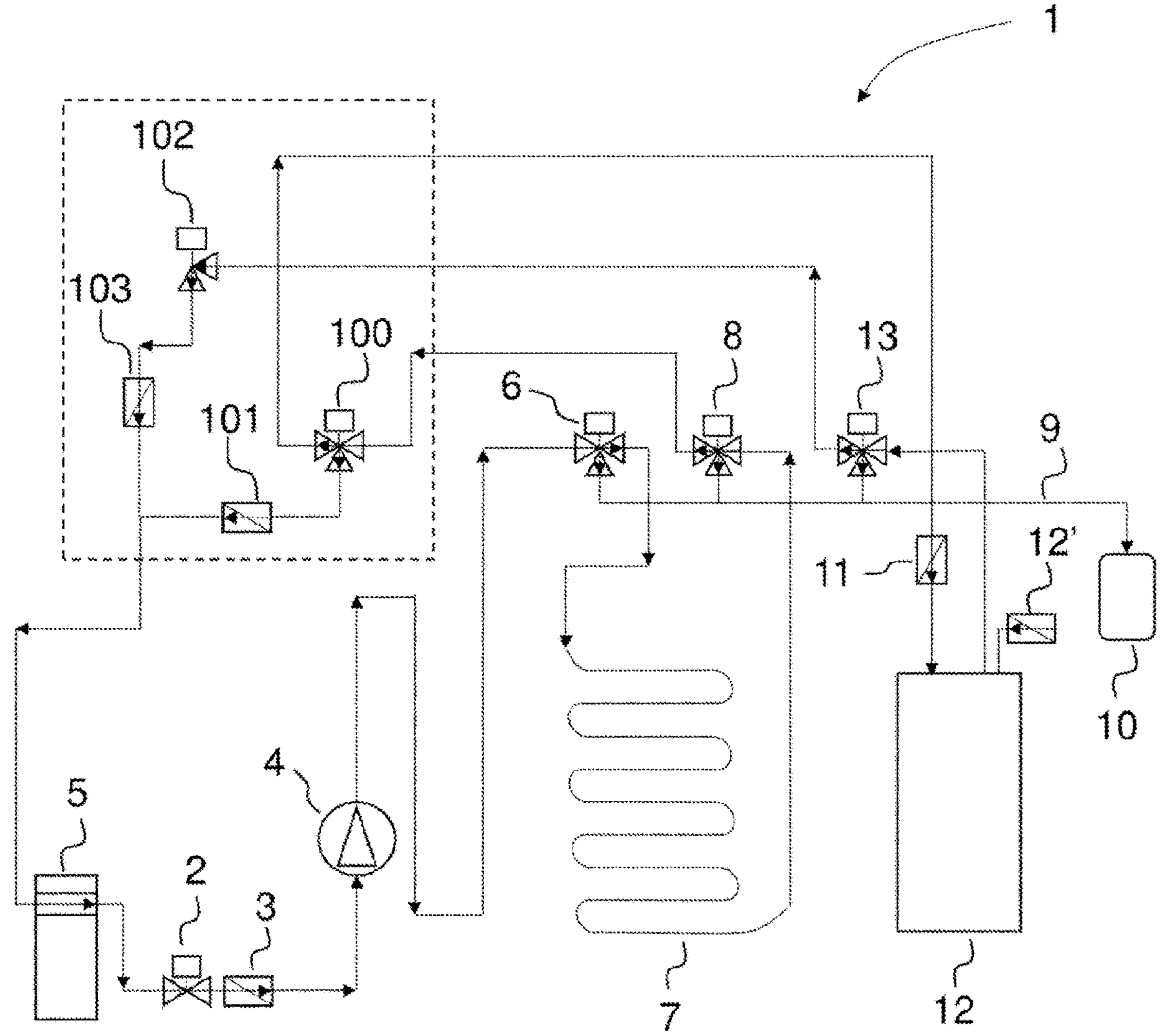
FIG. 6 illustrates a schematic representation of a sixth embodiment of the system configured to provide for the re-introduction of chilled still water and carbonated chilled water into the hydraulic circuit with external filter of a distributor capable of dispensing still water at room temperature, chilled still water and carbonated chilled water.

FIG. 6 illustrates a sixth embodiment of the water recirculation system 1 in the hydraulic circuit with external filter 5 of a distributor. In particular, the embodiment illustrated here refers to the same as in FIG. 3 but, this time, the activated carbon filter 5 is positioned externally to the hydraulic circuit, and therefore externally to the same dispensing distributor.

The first and second recirculation solenoid valves 100 and 102 of the system 1, which are preferably operable in sequence for recirculation purposes, respectively provide a) a first re-introduction into the hydraulic circuit of chilled water through the outlet 100' of the first recirculation solenoid valve 100 and b) a subsequent re-introduction into the hydraulic circuit of carbonated chilled water through the outlet 102' of the second recirculation solenoid valve 102, where in particular the said re-introduction provides for a prior flow of the water that must be recirculated in the external filter, which is in direct hydraulic contact with the said outlets of the recirculation solenoid valves 100, 102.

Figure 7:
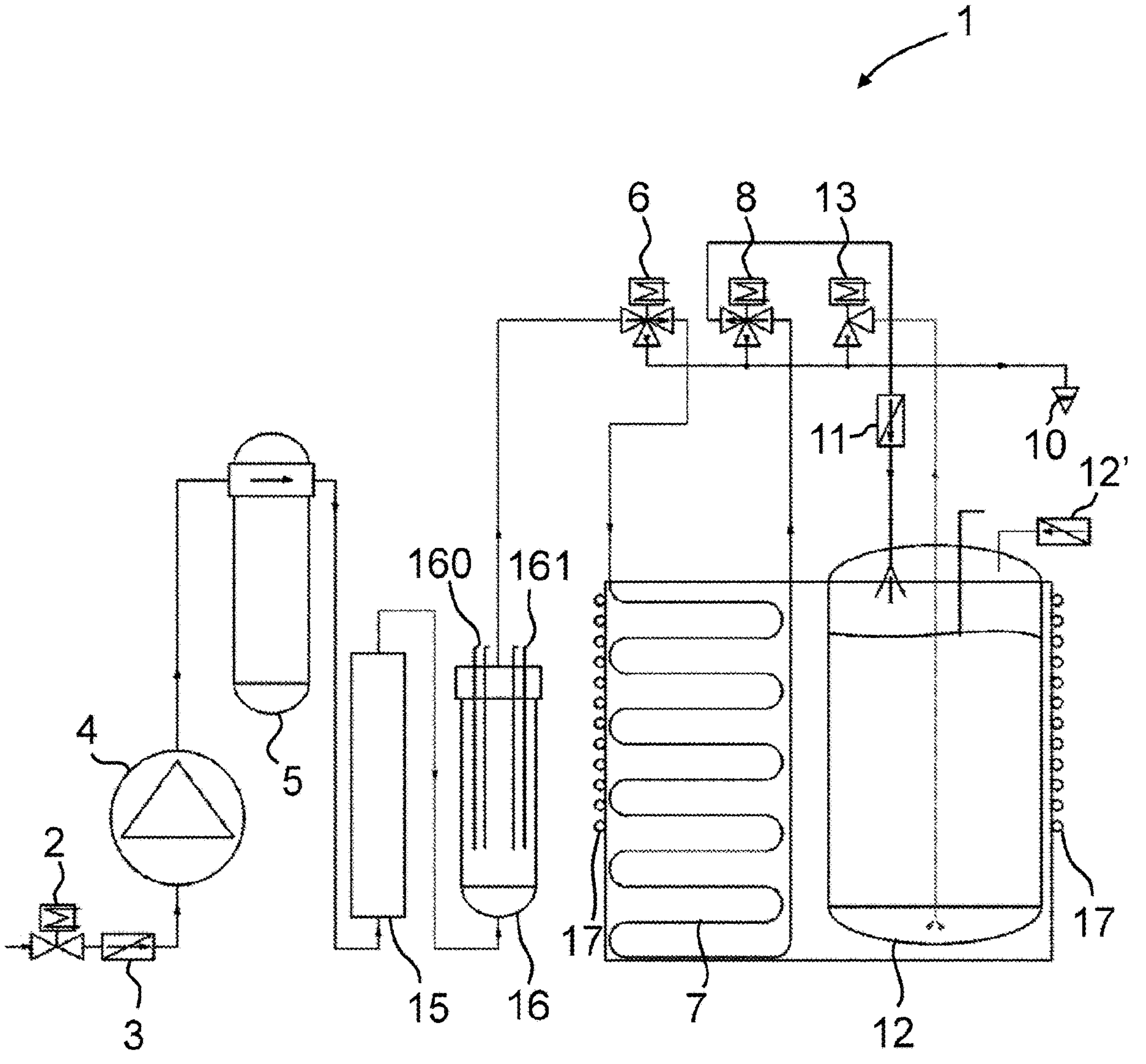
FIG. 7 illustrates a schematic representation of a seventh embodiment of the system configured with an internal filter of a distributor capable of dispensing still water at room temperature, chilled still water and carbonated chilled water, without re-introducing water into the hydraulic circuit.

FIG. 7 illustrates an embodiment example of the system, without re-introduction of water into the hydraulic circuit. As in the examples in FIGS. 2, 3, 5, 6 and 8, the path of the hydraulic circuit is as follows:

a. The water enters the water distributor through a main solenoid valve 2 or safety solenoid valve equipped with a non-return valve 3.

b. The water exits the main solenoid valve 2 and enters the pump 4.

c. The water exits the pump 4 and enters the filter 5.

d. The water exits the filter 5 and enters the solenoid valve for dispensing water at room temperature 6.

e. The water exits the solenoid valve for dispensing water at room temperature 6 and enters the coil 7.

f. The water exits the coil 7 and enters the solenoid valve for dispensing cold water 8.

g. The water exits the solenoid valve for dispensing cold water 8 and enters the carbonator 12.

h. The water exits the carbonator 12 and enters the solenoid valve for dispensing carbonated water 13.

i. All the dispensing solenoid valves are connected in parallel via a collector connected to the dispensing nozzle 10.

Also illustrated in the figure is the cooling system 17, common to all the described embodiments.

Downstream of the filter 5 are connected, preferably in series, a germicidal led lamp module of the UV-C type 15 and an ion enrichment module 16 of the Ag/Cu type.

The UV-C 15 module performs a localised reduction of the suspended biomass, decreasing the circulating bacterial load to zero.

The ion enrichment module 16 releases active elements such as Ag+ and Cu+ ions into the circuit.

The ion enrichment module 16 is based on the concept of controlled electrolysis, with the release of metal ions from the anode to the cathode. The deposition of metal ions on the cathode is prevented by polarity reversal and by mechanical action carried out by the water flow.

There are two pairs of copper electrodes 160 and silver electrodes 161 with independent control circuits. The present invention prevents the complete flow of ions from one electrode to the other both through the pressure of the water flow, through the pump 4 that drags the ions into the hydraulic circuit, and because the ion enrichment module 16 is configured to perform an alternating polarization of the electrodes 160 and 161.

In particular, the electrodes 160 and 161 are alternately polarized if the pump 4 is switched on and, however, the polarization has a very short period (calculated on the basis of the flow rate and pressure of the water) that prevents the formation of colloids (the colloids have no biocidal effect) and the deposition of oxides on the negative electrode or of salts.

Silver and copper rods will wear away slowly without surface deposits (oxides and salts) and without suspended colloids that would prevent or reduce the enrichment of water ions.

The water conductivity measurements carried out by appropriate probes inserted in different points of the circuit (upstream and downstream of the filter) guarantee a real-time control of the presence of metal ions and any colloids in order to guarantee the maximum biocidal benefits without impacts on water quality and safety.

Additionally, electrodes 160 and 161 are always polarized in pairs of the same metal (Cu—Cu and Ag—Ag) and never simultaneously. The electrodes are driven through a FULL H BRIDGE type driver that allows the electrodes to become alternately positive or negative (null potential with respect to the power supply of the dispenser or, for larger flow plants, possibly connected to the ground of the electrical system) and, when the complementary torque is active, remain de-energized in the "float" potential state.

An enrichment is referred to here, and not of a water ionizer because the release of ions is controlled, the ion flow is not complete and the electrolysis cycle is prevented (there is no generation of 02 or H2 except in a minimal way and in any case mixed in the water flow).

In addition, since there is no separator (electrolytic cell) of positive and negative ions downstream, there is no mention of alkaline ionized water or acidic water, being the H+ and OH− ions (generated by the same enrichment) mixed in the flow.

Figure 8:
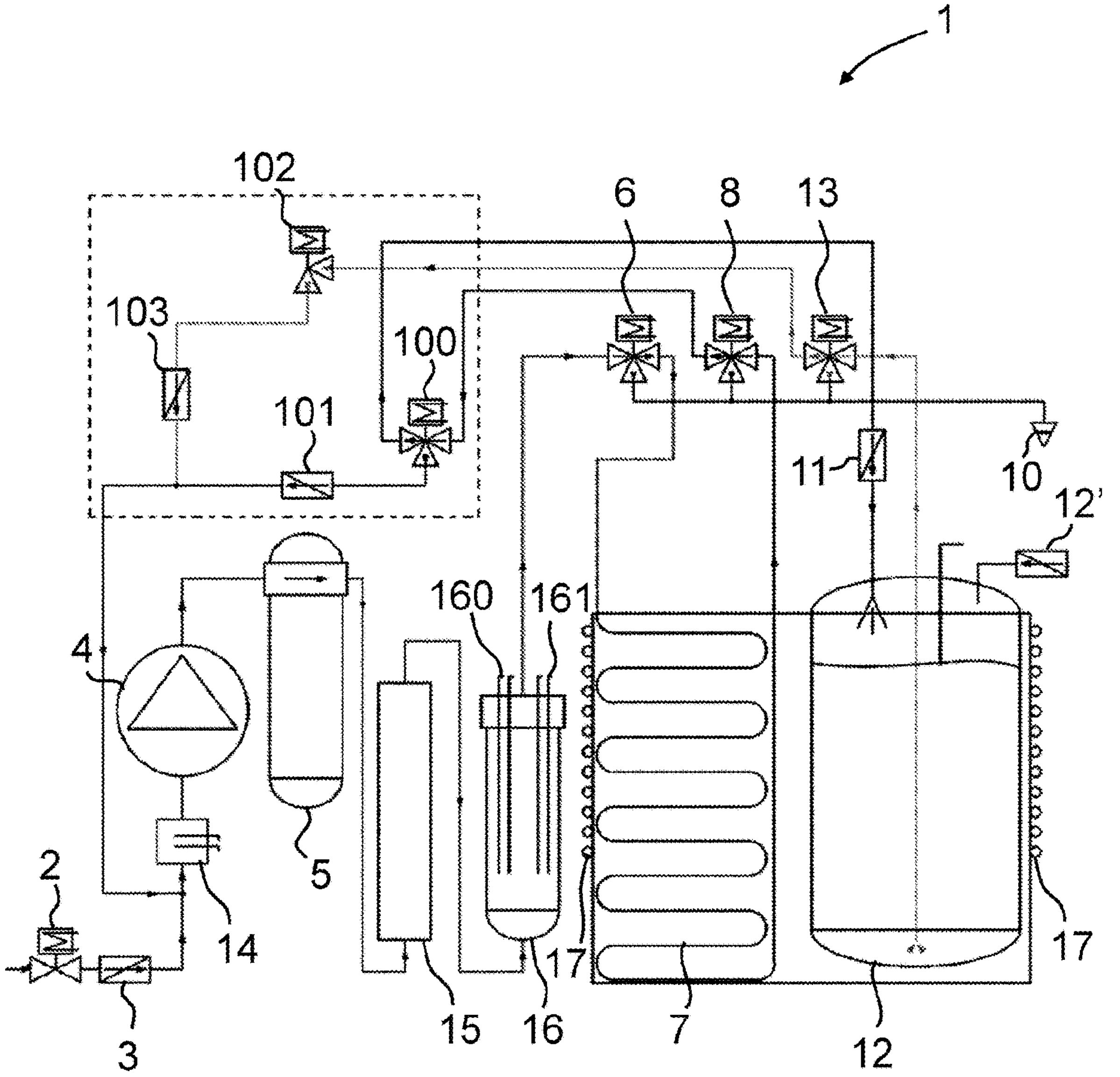
FIG. 8 illustrates a schematic representation of an eighth embodiment of the system configured to provide for the re-introduction of chilled still water and carbonated chilled water into the hydraulic circuit with an internal filter of a distributor capable of dispensing still water at room temperature, chilled still water and carbonated chilled water.

FIG. 8 illustrates an embodiment with a configuration with re-introduction of water into the hydraulic circuit and internal filter 5 similarly to that illustrated in FIG. 3. This embodiment is provided with a germicidal lamp module 15 and ion enrichment module 16 as shown in FIG. 7 and a water conductivity probe 14. This and other probes and sensors can also be provided in the other embodiments.

It is possible to configure the control unit, not shown in the figure, to measure some parameters such as quantity and type of water dispensed, time interval between the dispensing phases, ambient temperature, salinity, to determine the condition of risk of bacterial growth.

The present invention significantly reduces the risks of bacterial growth and biofilm formation using two main factors:

reducing the staticity of the water, reducing the temperature of the water contained in the internal water circuits of the water distributor, lowering the temperature of the internal or external filter, controlling the pH of the water.

Part of the water circuits inside the water distributor involving the cold still water and consequently the water contained therein, in particular that contained in the coil of the exchanger 7, are maintained at a controlled temperature of 4° C., therefore in bacteriostatic condition.

The carbonated water is usually stored in a pressurized tank called a carbonator 12 which is also normally chilled to 4° C. Carbonated water is less affected by the risk of increased bacterial load due to the presence of carbonic acid obtained by combining water with CO2 (low pH).

The present invention involves the use of still cold water and carbonated cold water to condition the temperature and water in the non-refrigerated water distributor circuits, including the filter 5.

As described above, the water circuits in the water distributor are connected in cascade to each other; using this hydraulic scheme, the carbonator charge pump 12 is also used to recirculate the cold water contained in the coil exchanger 7 in the circuits of the internal and external water distributor including the activated carbon filter 5, in order to reduce the temperature of the components and the water contained therein.

The recirculation of water is made possible thanks to the addition of a bypass solenoid valve 100 that allows the pump, when operating in recirculation mode, to take cold water from the outlet of the coil exchanger and pump it into the circuit by making it recirculate therein.

Activation of this function can be automatically controlled by the control unit by controlling the parameters described above.

The recirculation function significantly reduces the formation of biofilm; in fact, in addition to lowering the temperature of the hydraulic circuits of the non-chilled WD, it eliminates the staticity of the water, a determining factor for the formation of the biofilm.

It is possible to provide the embodiments of FIGS. 7 and 8 with the configurations of the embodiments of FIGS. 4, 5 and 6, in particular with the external filter 5.

While the invention is subject to various modifications and alternative constructions, some preferred embodiments have been shown in the drawings and described in detail.

It should be understood, however, that the invention is not intended to be limited to the specific embodiments illustrated but rather the aim is to cover all the modifications, alternative constructions and equivalents falling within the scope of the invention as defined in the claims.

What is claimed is:

1. A drinking water distributor device provided with a hydraulic circuit comprising:

a) an inlet solenoid valve in said circuit, b) a pump connected downstream of said inlet solenoid valve, c) a first dispensing solenoid valve connected downstream of said pump and a second dispensing solenoid valve, d) a refrigeration unit, e) a collector and f) a dispensing nozzle connected downstream of said collector, said first and second dispensing solenoid valves each having a first outlet in connection with said nozzle through said collector, said first dispensing solenoid valve being provided with a second outlet in connection with an inlet of said second dispensing solenoid valve through the refrigeration unit, such that said first and second dispensing solenoid valves are configured to provide dispensing of water at room temperature and of chilled water respectively, characterized in that said second dispensing solenoid valve is provided with a second outlet, a first recirculation solenoid valve configured to receive the chilled water dispensed from the second outlet of said second dispensing solenoid valve being provided, said first recirculation solenoid valve being connected to the circuit between the inlet solenoid valve and the first dispensing solenoid valve through the first outlet thereof and being configured to provide through said first outlet of the first dispensing solenoid valve the re-introduction of the chilled water into said hydraulic circuit.

2. The device according to claim 1, wherein said first recirculation solenoid valve comprises a second outlet, a carbonator being provided and a third dispensing solenoid valve having a first outlet being provided, the carbonator being configured to receive the chilled water from said second outlet of said first recirculation solenoid valve and to send the carbonated chilled water to said third dispensing solenoid valve, said third dispensing solenoid valve having said first outlet connected to said nozzle through said collector to provide for the dispensing of the carbonated chilled water.

3. The device according to claim 2 comprising at least a second recirculation solenoid valve having one outlet, said second recirculation solenoid valve being configured to receive the carbonated chilled water dispensed from a second outlet of said third dispensing solenoid valve and provide through said one outlet the re-introduction of the carbonated chilled water into said hydraulic circuit.

4. The device according to claim 3, wherein said first and second recirculation solenoid valves are configured to provide for the recirculation of said water in the hydraulic circuit alternately with each other.

5. The device according to claim 3, wherein said first and second recirculation solenoid valves are configured to provide for the re-introduction of said chilled water into the hydraulic circuit downstream of said inlet solenoid valve.

6. The device according to claim 1, comprising an internal filter connected to the said hydraulic circuit downstream of the said inlet solenoid valve.

7. The device according to claim 1, comprising an external filter connected to said hydraulic circuit upstream of said inlet solenoid valve.

8. The device according to claim 7, wherein said first recirculation solenoid valve is configured to provide for the re-introduction of said chilled water into the hydraulic circuit by prior flushing of said chilled water into said external filter.

9. The device according to claim 1, wherein an Ag/Cu ion enrichment module is provided in connection with said hydraulic circuit.

* * * * *